C. H. SMITH.
LATHE ATTACHMENT.
APPLICATION FILED JAN. 26, 1915.
1,272,549.
Patented July 16, 1918.
3 SHEETS—SHEET 3.
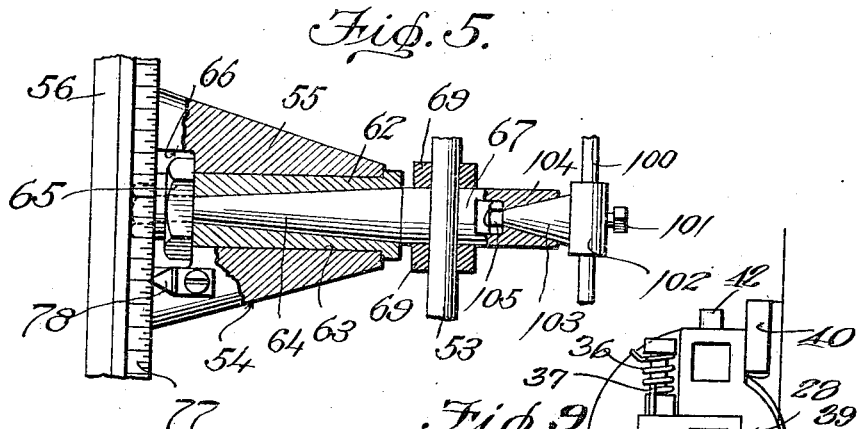
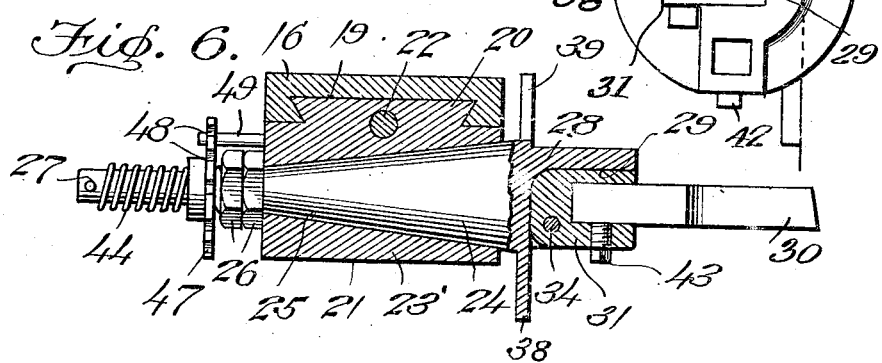
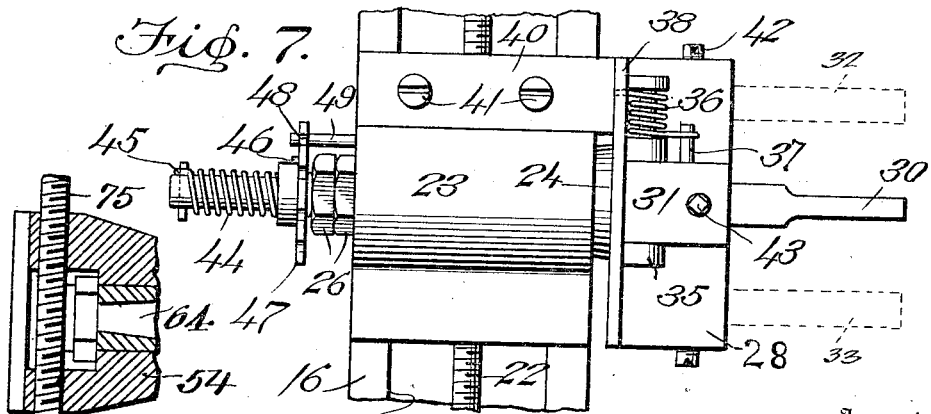
Inventor
Charles H. Smith,
By Richard B. Owen.
Attorney
Witnesses

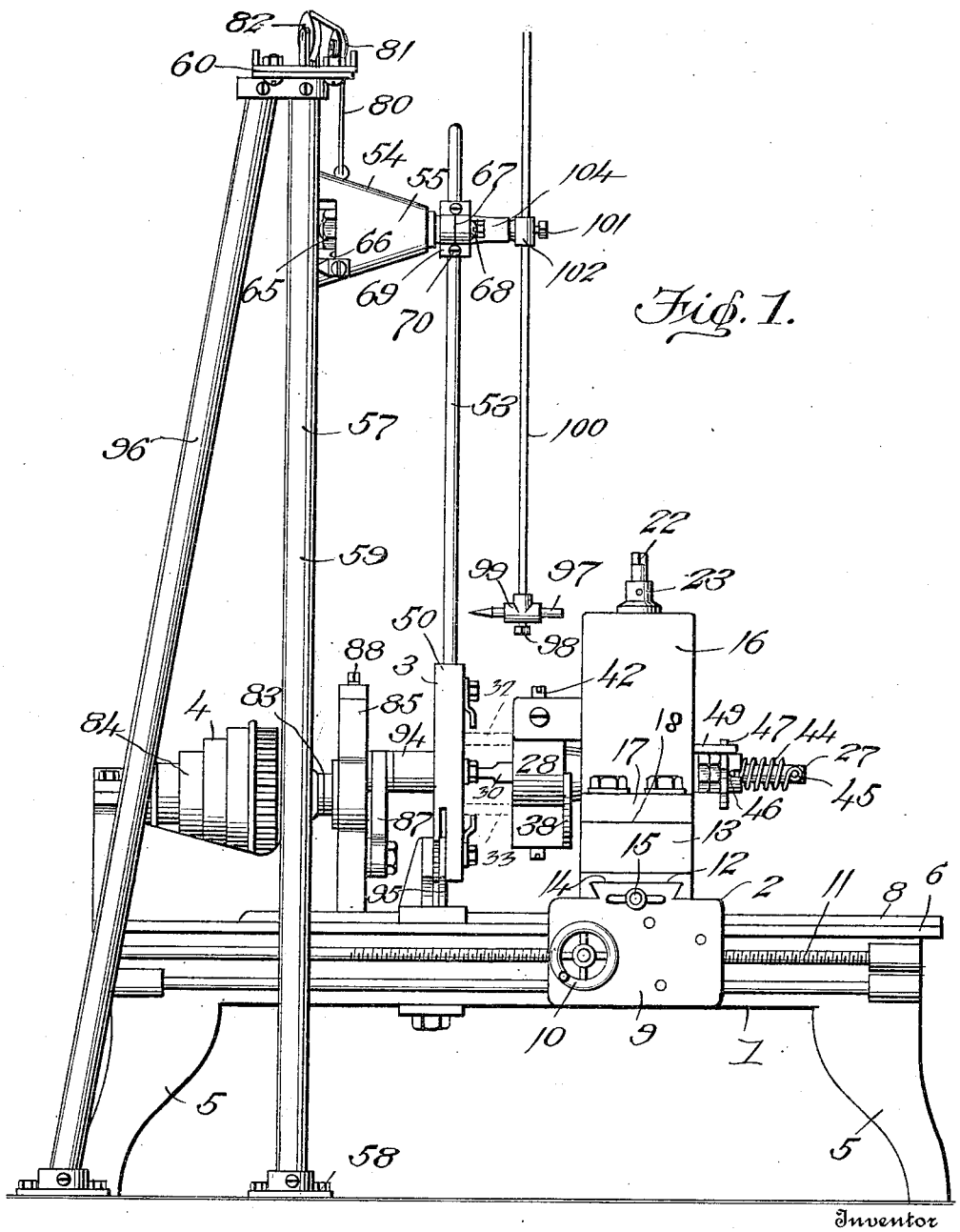

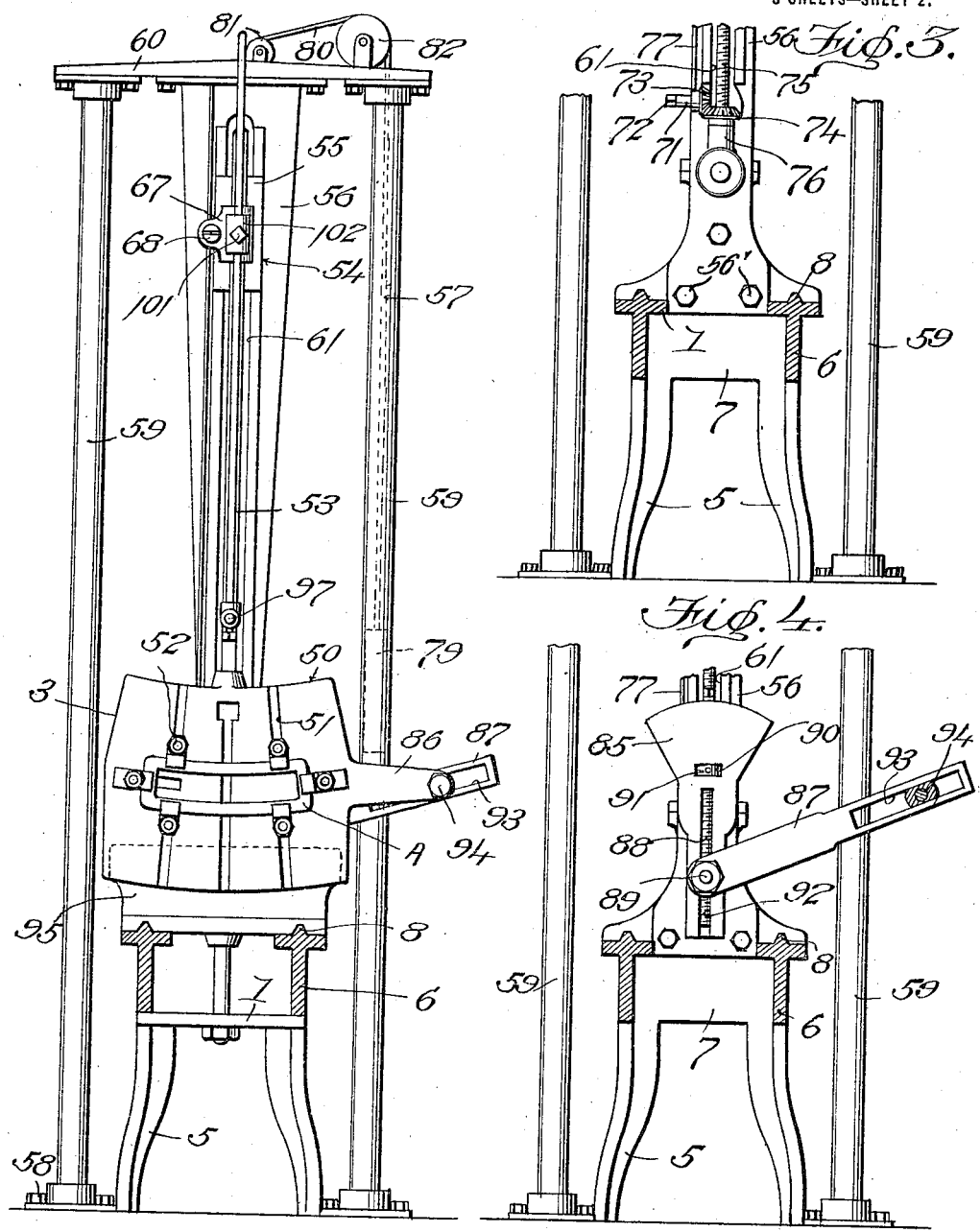

UNITED STATES PATENT OFFICE.

CHARLES HENRY SMITH, OF SANFORD, FLORIDA.

LATHE ATTACHMENT.

1,272,549.  Specification of Letters Patent.  Patented July 16, 1918.

Application filed January 26, 1915. Serial No. 4,510.

*To all whom it may concern:*

Be it known that I, CHARLES HENRY SMITH, citizen of the United States, residing at Sanford, in the county of Orange and State of Florida, have invented certain new and useful Improvements in Lathe Attachments, of which the following is a specification.

My invention relates to lathes and more particularly to attachments therefor.

The object of the invention is to provide a device which will operate effectually to cut arc links, etc., in a minimum amount of time and with facility, accuracy and ease.

A further object of the invention is to provide and mount an oscillatable work holder in such a novel and peculiar manner as to provide for vertical adjustment to increase or diminish the radius of the arc described incident to its oscillation.

As a still further object I contemplate means whereby the throw or the oscillatory stroke of the work holder may be varied.

A further object of the invention is to generally improve the construction and arrangement of the various parts constituting the turret or tool holding device, the novel arrangement providing for adjustment longitudinally and transversely of the lathe bed and if desired, vertically relatively thereto.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views and in which—

Figure 1, is a side elevation of my improved attachment as applied to the bed of a lathe.

Fig. 2, is an elevation of the device looking at the face as applied to the bed of the work holder, the lathe bed being shown in section.

Fig. 3, is a view in cross section illustrating the means operable to vertically adjust the support element for the work holder rod.

Fig. 4, is a view similar to Fig. 3, illus-
trating the means operable to adjust or vary the length of the oscillatory stroke of the work holder.

Fig. 5, is a longitudinal sectional view, parts being shown in elevation, of the work holder rod support.

Fig. 6, is a longitudinal sectional view, parts being shown in elevation of the tool holder.

Fig. 7, is an elevation of the tool holder, and

Figs. 8 and 9 are detail views.

Referring now to the drawings by numerals 1 designates as an entirety the bed of the lathe, 2 as an entirety the tool holding carriage, 3 as an entirety the oscillatable work holder and 4 the operating or driving means therefor. I shall now proceed to describe in detail the various machine parts in the order named.

Legs 5 act as a support for the bed, the same comprising parallel sills or side rails 6 and transverse sills or end rails 7. The longitudinal or side rails 6 are each provided with a longitudinal rib or flange 8 for a purpose to be hereinafter fully described.

The carriage 2 includes the usual support or base 9, the said base or support being of a construction whereby to engage the rails 6 of the lathe bed and to move, upon adjustment, longitudinally thereof. Such longitudinal adjustment may be effected through manipulation of a hand wheel 10 having operative connection with a guide screw 11 mounted to extend longitudinally of the bed or frame. A dove-tailed projection 12 is formed on the top face of the base portion 9 of the carriage, the said projection acting as a support and guide for the transversely movable carriage portion 13, said portion having a complemental longitudinal groove formed therein to receive the dove-tailed projection noted above. Transverse adjustment of the carriage portion 13 may be effected through manipulation of the member indicated at 15 in Fig. 1.

Mounted on the transversely adjustable portion of the carriage is a tool holder support 16, the said support having a lateral projection 17 integral therewith. Said projection 17 is directly affixed to the carriage as indicated at 18. The opposite face of the support 16 from that engaging the carriage portion 13 is vertically grooved as noted at 19, the said groove being of a dove-tailed formation whereby to receive a complemental flange or projection 20 formed integrally with the turret or tool holder designated 21. Vertical adjustment of the tool holder 21 may be obtained through manipulation of a screw rod 22, the latter being held against movement relatively to the tool holder support by means of a collar 23 and disposed to penetrate the holder 21 as shown to advantage in Fig. 1. It is evident from the foregoing that the holder 21 may be adjusted longitudinally, transversely and vertically relatively to the bed of the lathe.

Heretofore the tool holder has been referred to in its entirety. A detail description brings to light the fact that the holder consists of a member 23' in the nature of a bearing, the said member having the mentioned flange or projection 20 integral therewith. A frusto-conical spindle 24 is arranged to fit a complemental bore 25 therefor in said bearing 23' while lock nuts 26 are threaded on an extension 27 of the spindle to hold the latter against longitudinal displacement relatively to its support. The opposite end of the spindle 24 from that carrying the nuts 26 is likewise extended and somewhat enlarged as indicated at 28, the enlargement being recessed as at 29 whereby to receive the tool 30 and its support 31. In Fig. 1 I have shown the tool holder 21 as equipped with three tools or blades one tool in full lines and two in dotted lines. The preceding description with reference to the tool 30 relates to that tool located centrally of the holder and adapted for engagement with the work acted on that the initial arcuate cut may be formed therein. The two remaining blades or tools 32 and 33 are mounted one at a time, one above and the other below the location for the tool 30, within the enlargement 28. The tools 32 and 33 are adapted for engagement one at a time with the top or bottom face of the work. For cutting a link formed of a solid blank of material, the tools 32 and 33 are removed and the tool 30, which should be of the round nose type at this stage is placed for engagement with the blank which has previously been marked in a manner to be presently described and perforated at each end for enabling the tool to enter the blank before making a stroke. When the solid blank has been cut through, a square nose tool is substituted for and in place of the tool 30 and the inside edges of the slot are cut smooth and true, for planing the surface of the link, and the top or bottom edges thereof, the tool 30 is removed and either the tool 32 or 33 is inserted in the holder for engaging either the top or bottom sides of the work respectively. Thus it will be seen that only one tool is employed at a time. Movement of the material or work holder in a cutting direction will cause the tool 30 to bite into the material in the manner desired. Movement of the tool 30, during back stroke movement of the work holder is against tension of a suitable spring 36 arranged to embrace the pin 37 and to normally maintain the tool 30 in an operative position. Spring 36 is fastened at one end to a pin 37 removable with the holder device 31 and at its opposite end to an annular flange 38 integral with the enlargement 28 forming the tool support.

Flange 38 is cut away as at 39 to form abutment shoulders adapted for engagement with a stop block 40 secured as at 41 to that portion of the carriage designated 16, the said block 40 being of a suitable size to extend beyond the forward end of the carriage as indicated in Fig. 7 whereby to engage the flange or shoulders as noted above. Fastening bolts 42 in the nature of set screws are provided to detachably secure the blades 32 and 33 to the enlargement 28, while a suitable set screw or fastening bolt 43 is provided to detachably secure the intermediate or oscillatable blade 30. From the foregoing it will be obvious that owing to the rotatable mounting of the tool holder within its support, when either the tool 32 or 33 is employed the tool holder will rotate and thereby move the tool out of engagement with the work upon a backward stroke of the work holder, it will be remembered of course that this operation is only possible when one of the tools 32 or 33 is employed at a time. It must also be remembered that the cutting stroke of tool 32 is in a direction opposite the cutting stroke of tool 33. Hence, when inserting one tool in the holder its cutting edge would be directed opposite to the cutting edge of the other tool when the latter is employed, in order that the spring 44 may act to relieve strain of the tool on the non-cutting stroke when either tool is used, and in order that the stop lug 40 may retain the tool holder against movement upon the cutting stroke of either tool. It is to provide for oscillatory movement that I mount the tool holder in the manner stated. Owing to this manner of mounting the tool holder it will be obvious that the tool holder oscillates only on the back or non-cutting stroke of the work holder and during a cutting stroke of the work holder the block 40, limits oscillatory movement of the tool holder whereby the tool is held rigidly and the work moved in engagement therewith to effect a removal of a portion of material from the surface of the work at each stroke. Such turning movement of the tool holder is against the tension of a spring 44 arranged to embrace the extension 27 of the spindle. Spring 44 is secured as at 45 to the extension 27 and at its opposite end to a disk 47 loosely mounted on said spindle. The connection between the spring 44 and the disk 47 is indicated at 46. Said disk is provided with a plurality of peripheral notches 48 within any one of which a pin 49 may be fitted, the said pin being carried by the bearing block 20 whereby to preclude rotation of the disk with the spindle. The spring 44 will also act as a means whereby the disk is maintained in yielding frictional contact with the lock nuts 26. Said disk, when it is desired that the tension of the spring 44 be varied, is moved longitudinally of the extension and against tension of the spring and subsequently locked in its adjusted position by fitting the pin 49 in any one of the notches 48 therefor. Spring 44 acts automatically to return the tool carrying device to its normal perpendicular position immediately subsequent to its oscillatory movement caused by engagement of the tool blades with the material to be cut.

Passing on to the detailed description of the work holder and its support, 50 designates the work holder proper, the same being provided with the usual grooves 51 within which the fastening devices 52 for the material acted on are adjusted. The material acted on, for the purpose of exemplifying its position relatively to the tool holder is shown and designated A. The fastening devices 52, which, in Fig. 2 are shown as engaging the front face of the work, may be adjusted or moved over the operating face of the tool holder to vary the position of the material A as occasion demands. When planing the face of the work, the fastenings 52 are rotated at right angles to their positions shown in Fig. 2, so as to engage the edges only of the work. Work holder 50 is bodily oscillatable relatively to the tool holder 21. The lower edge of the work holder 50 is longitudinally slotted forming bifurcated portions, the rearmost of said portions extending into the space between the guide plates secured to the frame and to be presently described. A rod 53 serves as a support for the holder, the said rod being disposed to extend vertically and to be supported for oscillatory movement through the medium of a novel rod support designated as an entirety by the numeral 54. The rod support 54 comprises a bearing block 55 adapted for frictional engagement with a guide plate 56, the said plate being supported in a vertical position by means of an upright frame 57 secured as at 58 to the lathe support and comprising standards 59 and a cross head 60. The vertical guide plate 56 is directly attached to the cross head 60 and to the support provided for the operating mechanism designated 4 by means of bolts 56'. Guide plate 56 is provided with a vertical slot 61 through which extensions of the bearing 55 extend, suitable means (not shown) maintaining the said bearing block in engagement with the plate 56 in such relation thereto as to provide for the desired vertical adjustment of the rod support 54 as will hereinafter appear. A sleeve like device 62 is arranged to fit a bore 63 therefor formed in the bearing block 55, the said sleeve like device being adapted to receive a spindle 64 which directly supports and mounts the support rod 53. Said spindle is held against longitudinal displacement relatively to the bearing 55 and the sleeve 62 by means of lock nuts 65 threaded on an extension of the spindle and fitting a recess 66 formed in the bearing block.

As shown in Fig. 5, the rod 53 is adapted to penetrate the spindle 64, or rather a clamp device 67 formed integrally therewith, said clamp device being adapted for engagement with the rod and adjustable through manipulation of a set screw 68. The set screw when tightened will preclude movement of the support 54 relatively to the rod 53. As a further preventive of such movement of the support, I provide collars 69 disposed one above and the other below the clamp device 67, each collar carrying a set screw 70 which may be tightened so as to lock the respective collars against movement longitudinally of the rod.

To vertically adjust the support 54 bodily relatively to the guide plate 56, it is but necessary to rotate a stub shaft 71 having a polygonal extension 72 formed thereon, the said extension being adapted to receive the complementary head of a crank arm or wrench (not shown). A beveled pinion 73 is mounted on the shaft 71 and adapted for meshing engagement with a like pinion 74 mounted on a vertical screw rod 75, the said screw rod being arranged to penetrate the bearing block 54 whereby to move said block upon rotation of the rod. The rod 75 is journaled at one end in a suitable bearing 76 therefor and at its opposite end in the cross beam comprising a part of the upright frame 57.

Guide plate 56 also acts as a support for a dial plate 77 extending longitudinally thereof and at one side of the bearing block 54, the said dial plate being traversed by an indicator 78 secured to the support whereby to indicate in inches, (and if desired fractions thereof) the radial dimension of the arc of the circle described by the holder 50 during its occillatory movement imparted in a manner to be hereinafter described.

If desired, a counter-balance weight 79 may be connected to the support member 54 by means of a cord or the like flexible element 80, the said cord or element being arranged over pulleys 81 and 82 mounted on the cross head 60 of the upright frame. As shown, the counter-balance weight 79 operates within one of the standards 59 forming a part of the frame, the said standards being hollow.

The oscillatory movement necessary to the operation of the present invention is imparted to the work holding implement through rotation of an operating shaft 83, said shaft receiving its motion through a source of power, the power being imparted to the shaft 83 by means of a belt (not shown) adapted to operate over the cone pulley 84 mounted on said shaft. A specially devised crank arm 85 is mounted to rotate with the shaft 83, the said arm being in the nature of an elongated frame having adjustable means operating within. Crank arm 85 is directly connected to an extension 86 of the work holder by means of a link 87, having adjustable connection at one end with the arm, and at its opposite end with the extension 86. The adjusting means carried by the arm comprises a screw rod 88 arranged within the frame and to extend longitudinally thereof, the said link 87 having connection with the screw rod at a point designated 89. Rod 88 is held against movement relatively to the arm 85 by means of a collar 90 operating in an opening 91 therefor formed in the said arm, such arrangement causing upon rotation of the screw rod the inner end of the connecting link to be moved toward or from that point upon the arm having direct connection with the operating shaft 83. When moved away from the shaft, the throw or length of the oscillatory stroke imparted to holder 50 is increased and when moved oppositely or toward the shaft 83 the throw or length of the oscillatory stroke is decreased. Arm 85 is provided with a longitudinal slot 92 which acts as a guide for the inner end of the link 87 during its adjustment.

As a means whereby the position of the work holder, may be adjusted or varied relatively to the tool holder I provide an elongated opening 93 in the link 87, the mentioned opening having a connecting means 94 adjustable therein. The said connecting means is fastened at its opposite end to the extension 86 of the work holder.

To guide the holder 50 during oscillation, I provide a longitudinally grooved guide member 95, the groove in said member being of a size to receive a portion of the holder 50 and direct movement of said holder transversely of the lathe bed 1. The upright frame 57 may be braced as indicated at 96.

Now in order that the material A may be accurately adjusted and properly positioned relatively to the holder 50, and to the blades 30, 32 and 33, I provide an indicator 97, the said indicator being adjustable toward and from the face of the holder 50 through manipulation of a set screw 98. A sleeve 99 supports the indicator 97, the sleeve in turn being supported by a rod 100 adjustable vertically relatively to the holder 50 and to the support 54 through manipulation of a thumb screw 101. A collar 102 is carried by the rod 100, the collar being supported for movement relatively to the member 54 through the medium of a cone 103 operating in a bearing therefor formed by an extension 104 of the spindle 64. A nut 105 is threaded on an extension of the spindle 103 to hold said spindle against longitudinal displacement.

Operation is as follows: Subsequent to arrangement of the link upon the holder 50, the tool holder is moved away from the work holder and the indicator lowered that the point of the needle 97 may contact (or nearly so) with the face of the material to be cut. By moving the indicator back and forth over the face of the work it is evident that accurate adjustment of the work upon the holder may be readily obtained. The exact size and shape of the opening to be formed in the work may be marked thereon by the needle or indicator 97 prior to the engagement of the cutting tools with said work. During operation of the tools, the indicator is elevated to the position indicated in Fig. 1 through manipulation of the thumb nut 101.

From the foregoing, taken in connection with the accompanying drawings it will be noted that the radius of the arc of the circle described by the holder 50 may be varied through vertical adjustment of the support 54, that the work acted on may be accurately positioned relatively to the holder, the indicator 97 facilitating accurate adjustment of the work and that the support means for the blades 30, 32 and 33 is of a novel formation whereby to provide for a limited oscillatory movement of the blades during a cutting operation, the several blades automatically returning to a position for operation immediately subsequent to each movement against tension of the spring 44.

When a blank is positioned and secured to the work holder 50, and the block 54 is adjusted vertically so as to include the proper radius between the center of oscillation of the work, holder and the center of the tool holder so as to correspond to the radius of the arcuate slot to be cut, the marker 97 is lowered into proximity to the blank and its sharpened point brought against the blank and oscillated whereby to inscribe upon the blank the outline of the arcuate slot to be cut. The outline will then form a guide for the operator to regulate the cutting operation of the tool.

Having thus fully described my invention, what I claim as new and desire to secure by Letters Patent, is:—

1. As an attachment to a lathe, an oscillatable work holder for positioning adjacent the tool holder of the lathe, guide means for the holder, means to oscillate the holder, a support for the holder, the holder being oscillatable relatively to the support, means to move the support toward and from the holder to vary the radius of the arc described by the holder during movement, said means being operable to lock the support against relative movement subsequent to adjustment.

2. As an attachment to a lathe, an oscillatable work holder, a rod supporting the holder, support means for the rod adjustable vertically and in a straight line, means operable to adjust the rod support toward and from the holder, said means being operable to lock the support for the rod subsequent to adjustment, and a member rotatable relatively to the support and directly attached to the rod, said member permitting oscillatory movement of the rod with the holder from a fixed point subsequent to vertical adjustment as aforesaid.

3. In a machine of the character described, an oscillatable work holder, means to oscillate the holder, an upright frame, means movable relatively to the holder to vary the radius of the arc described thereby during movement, and a screw rod turnable to adjust said last mentioned means.

4. In a machine of the character described, the combination of an oscillatable work holder, means to move the holder, a member adjustable relatively to the holder, a screw rod turnable to move said member, and a support for the holder oscillatable relatively to said member, said support being carried by said member to provide a fixed point of oscillation for the holder, and means for varying the length of travel of the holder.

5. In a machine for cutting arc links, an oscillatable work holder, means to oscillate the holder, a support rod for the holder, a rod support, a member adjustable relatively to the holder within which the rod support is turnable, the said member being adjustable to vary the radius of the arc described by the holder during movement, means to indicate the position of the member relatively to the holder, a screw rod turnable to adjust the member, said means being operable to lock the rod against movement relatively to its support subsequent to adjustment of the latter thereof.

6. In a machine of the character described, the combination with the oscillatable work holder, operating mechanism therefor, means for varying the radius of the arc described thereby during movement, and the support means for the holder, of a carriage adjustable longitudinally and transversely of the support, a tool holder adjustable vertically relatively to the carriage, and a screw rod turnable to adjust the holder.

7. In a machine for cutting arc links, the combination of a tool holding device mounted for oscillatory movement, a plurality of blades mounted on the device to engage the work acted on and impart to said device the oscillatory movement above referred to by reason of the forced engagement of the work therewith, a spring means mounted to operate automatically to return the device to its normal position subsequent to disengagement of the blades with the work, means to vary the tension of the spring, and means to move the device vertically relatively to the work acted on.

8. In a machine for cutting arc links, an adjustable bearing support, a tool holding device turnable relatively to the support, a flange formed on the said device, an abutment block mounted on the bearing support to engage the flange and normally maintain the said device in an operative position, a plurality of tools mounted on the device to move therewith, and spring means maintaining the device normally in an operative position and in engagement with the abutment block, as and for the purpose set forth.

9. In a machine of the character described, a bearing support, a tool holding device oscillatable relatively to the support by reason of its engagement with the work acted on, a flange integral with the said device, an abutment block secured to the support and disposed for engagement with the flange to normally maintain said device in an operative position, spring means maintaining the flange in engagement with the abutment flange, means to vary the tension of the spring, and means to adjust the bearing block vertically to vary the position of the tool holding device relatively to the work acted on, as and for the purpose set forth.

10. In combination, an oscillatable work holder, operating means therefor, means adjustable relatively to the holder to vary the radius of the arc described thereby during movement, and a tool holding device adjustable transversely, longitudinally and vertically relatively to the work holder, as and for the purpose set forth.

11. In combination with a lathe, a frame adapted to be positioned over the lathe, a work holder, means for suspending the same from the frame, for oscillation in a vertical plane and transversely of the lathe, a guide means, and means for securing the same to the bed of the lathe, said guide means engaging the work holder to guide the same during oscillation thereof.

12. In combination with a lathe, a frame adapted to be positioned over the lathe, and mounted upon the floor, vertical guide members depending from said frame, and secured to the head stock of the lathe, means movable in the guide members for supporting the work holder to permit oscillation of said holder in a vertical plane and in a direction transversely of the lathe, means attachable to the bed of the lathe for engaging the work holder to guide the same during oscillation, and means operable by rotation of the lathe spindle for oscillating the work holder.

13. In combination with a lathe, a frame adapted to be positioned over the lathe, a work holder, means for suspending the same from the frame, for oscillation in a vertical plane and in a direction transversely of the lathe, means attachable to the lathe for engaging and guiding the work holder during oscillation thereof, a supporting means movable upon longitudinal ways of the lathe bed, a supporting member movable on said supporting means, transversely of the lathe bed, and a tool holder mounted on said supporting member.

14. In combination with a lathe, a frame comprising vertical members adapted to rest upon the floor and to be disposed at opposite sides of the lathe, a horizontal member connecting the upper ends of said vertical members of the frame, vertical guide members depending from said horizontal member, and secured to the head stock of the lathe, a screw extended vertically and between said guide members, a block movable vertically in said guide members, and having a threaded aperture in which to receive the screw, means for rotating the screw to move the block vertically, a counter-weight and flexible element connecting said counter-weight with the block to counter balance the weight thereof, a work holder, means for suspending the work holder from the block for oscillation in a vertical plane and in a direction transversely of the lathe, means attachable to the lathe for guiding the work holder during oscillation thereof, and a tool holder positioned upon the lathe adjacent the work holder.

15. In combination with a lathe, a frame adapted to be positioned over the lathe, vertical guides suspended from said frame and connected at their lower ends to the head stock of the lathe, a block movable in said guide, a work holder, means for suspending the work holder from the block for oscillation in a vertical plane and in a direction transversely of the lathe, means attachable to the lathe for engaging and guiding the work holder during oscillation thereof, an arm adapted to be secured to the lathe spindle for rotation therewith, and a link adjustably and eccentrically connected to the arm relative to the center of rotation thereof, and adjustably connected to the work holder whereby the work holder may be oscillated during rotation of the lathe spindle, and a tool holder mounted upon the lathe bed in proximity to the work holder.

16. In a machine for cutting arc links, an oscillatably mounted work holder, a tool holder rotatable about an axis perpendicular to the plane of oscillation of the work holder, a tool mounted in said holder eccentrically relative to the center of rotation of the holder whereby upon engagement of the tool upon the work, the tool holder may oscillate upon a non-cutting stroke of the work-holder, and means for limiting oscillation of the tool holder in either direction.

17. In a machine for cutting arc links, a work holder oscillatably mounted, a tool holder mounted for rotation about an axis perpendicular to the plane of oscillation of the tool holder, a tool mounted upon the tool holder, eccentrically relative to the center of rotation thereof, whereby the tool holder may oscillate upon a non-cutting stroke of the work holder, and means for mounting a tool in a position coincident with the center of oscillation of the tool holder and for oscillation relative to the holder whereby said tool may oscillate upon a non-cutting stroke of the tool holder.

In testimony whereof I affix my signature in presence of two witnesses.

CHARLES HENRY SMITH.

Witnesses:
F. A. BISSETT,
JOHN ADAMS.

Copies of this patent may be obtained for five cents each, by addressing the "Commissioner of Patents, Washington, D. C."